(12) United States Patent
Yoshisaka et al.

(10) Patent No.: US 10,596,901 B2
(45) Date of Patent: Mar. 24, 2020

(54) DIFFERENTIAL DEVICE

(71) Applicant: JTEKT CORPORATION, Osaka (JP)

(72) Inventors: Tadashi Yoshisaka, Kariya (JP); He Jin, Kariya (JP); Yasunori Kamitani, Fujima (JP)

(73) Assignee: JTEKT CORPORATION, Osaka-shi (JP)

( * ) Notice: Subject to any disclaimer, the term of this patent is extended or adjusted under 35 U.S.C. 154(b) by 127 days.

(21) Appl. No.: 16/007,333

(22) Filed: Jun. 13, 2018

(65) Prior Publication Data

US 2018/0361850 A1    Dec. 20, 2018

(30) Foreign Application Priority Data

Jun. 19, 2017  (JP) ................ 2017-119572

(51) Int. Cl.
| | |
|---|---|
| *B60K 23/04* | (2006.01) |
| *F16D 11/14* | (2006.01) |
| *F16D 27/09* | (2006.01) |
| *F16D 27/108* | (2006.01) |
| *F16H 48/08* | (2006.01) |
| *F16H 48/24* | (2006.01) |

(Continued)

(52) U.S. Cl.
CPC .............. *B60K 23/04* (2013.01); *F16D 11/14* (2013.01); *F16D 27/09* (2013.01); *F16D 27/108* (2013.01); *F16H 48/08* (2013.01); *F16H 48/24* (2013.01); *F16H 48/34* (2013.01); *F16H 48/40* (2013.01); *F16D 2500/1022* (2013.01); *F16D 2500/10425* (2013.01)

(58) Field of Classification Search
CPC ......... B60K 23/04; F16D 11/14; F16D 27/09; F16D 27/108; F16D 2500/1022; F16D 2500/10425; F16H 48/08; F16H 48/24; F16H 48/34; F16H 48/40
USPC ....................................... 475/230
See application file for complete search history.

(56) References Cited

U.S. PATENT DOCUMENTS

| 4,959,043 A * | 9/1990 | Klotz | F16H 48/08 |
|---|---|---|---|
| | | | 475/220 |
| 5,718,653 A * | 2/1998 | Showalter | B60K 17/3467 |
| | | | 180/249 |

(Continued)

FOREIGN PATENT DOCUMENTS

JP    2015-87015    5/2015

*Primary Examiner* — Leslie A Nicholson, III
(74) *Attorney, Agent, or Firm* — Oblon, McClelland, Maier & Neustadt, L.L.P.

(57) ABSTRACT

A differential device includes: a differential case on which a meshed portion is formed; a tubular slide member that has a meshing portion; a differential gear mechanism disposed inside the slide member; a pinion gear shaft that supports pinion gears of the differential gear mechanism; and an actuator that moves the slide member in the axial direction. The slide member has a cylindrical portion, on one side of which in the axial direction the meshing portion is formed, and a long hole that extends in the axial direction of the cylindrical portion and that opens toward the other side in the axial direction, which is the opposite side from the meshing portion. The pinion gear shaft is fitted with the long hole, and supported by the slide member. A reinforcing ring that suppresses deformation of the slide member is attached to an end portion of the cylindrical portion in which the long hole opens.

3 Claims, 8 Drawing Sheets

(51) Int. Cl.
*F16H 48/34* (2012.01)
*F16H 48/40* (2012.01)

(56) References Cited

U.S. PATENT DOCUMENTS

| | | | | |
|---|---|---|---|---|
| 9,878,615 | B2* | 1/2018 | Kamitani | B60K 23/04 |
| 2009/0082161 | A1* | 3/2009 | Krude | F16H 48/08 |
| | | | | 475/230 |
| 2015/0114786 | A1 | 4/2015 | Seidl | |
| 2015/0330494 | A1* | 11/2015 | Kluck | F16H 57/082 |
| | | | | 475/230 |
| 2016/0377161 | A1* | 12/2016 | Hornung | F16H 48/38 |
| | | | | 475/230 |
| 2017/0291491 | A1* | 10/2017 | Kamitani | B60K 23/04 |

* cited by examiner

DIFFERENTIAL DEVICE

INCORPORATION BY REFERENCE

The disclosure of Japanese Patent Application No. 2017-119572 filed on Jun. 19, 2017 including the specification, drawings and abstract, is incorporated herein by reference in its entirety.

BACKGROUND OF THE INVENTION

1. Field of the Invention

The present invention relates to a differential device that is mounted on a four-wheel-drive vehicle, for example, and that is capable of outputting an input drive force from a pair of output members while allowing differential motion.

2. Description of the Related Art

A differential device that outputs an input drive force from a pair of output members while allowing differential motion has hitherto been used as a differential device of a vehicle, for example. In some differential devices of this type, it is possible to block transfer of the input drive force to the output members. See Japanese Patent Application Publication No. 2015-87015 (JP 2015-87015 A), for example.

The differential device described in JP 2015-87015 A has: a differential mechanism that has two differential gears supported by a shaft-shaped journal and two side shaft gears; a differential case (housing) that houses the differential mechanism; an annular carrier element disposed between the differential case and the differential mechanism; a second clutch portion fixed to the carrier element; a first clutch portion that can be meshed with the second clutch portion; and an actuator that moves the first clutch portion with respect to the second clutch portion in the axial direction. A drive force is input to the differential case from a drive gear fixed to the outer peripheral surface of the differential case by welding or bolting. The carrier element is provided with two bores. The journal is inserted into the bores, and fixed by a fixing pin.

The first clutch portion has an annular portion and a plurality of axially projecting portions that project in the axial direction from the annular portion. Toothed ring segments to be meshed with the second clutch portion are provided at the distal ends of the axially projecting portions. The annular portion of the first clutch portion is disposed outside the differential case. The axially projecting portions are inserted through axial holes formed in a side wall of the differential case. Consequently, the first clutch portion is coupled to the differential case so as to be movable in the axial direction relative to and not to be rotatable relative to the differential case.

When the first clutch portion is moved in the axial direction toward the second clutch portion by operation of the actuator, the toothed ring segments of the axially projecting portions are meshed with the second clutch portion, which causes the carrier element to rotate together with the differential case. Consequently, the drive force which is input from the drive gear to the differential case is transferred to the differential gears via the first clutch portion, the second clutch portion, and the carrier element.

When the actuator is brought into a non-operating state, on the other hand, a return spring moves the first clutch portion away from the second clutch portion to release meshing therebetween, which makes the carrier element rotatable relative to the differential case. Consequently, transfer of the drive force from the differential case to the differential mechanism is blocked.

In the differential device described in JP 2015-87015 A, the drive force which is input to the differential case is transferred to the axially projecting portions of the first clutch portion via the side wall of the differential case. In order to secure the strength of the first clutch portion, however, the axially projecting portions must be increased in size. Therefore, the plurality of axial holes which are formed in the side wall for insertion of the axially projecting portions are increased in size, which makes it difficult to secure the strength in terms of structure. That is, in order to transfer a sufficient drive force to the first clutch portion by securing the strength of the side wall, the thickness of the differential case must be increased, which incurs an increase in size and weight of the device.

Thus, the inventors conceived of disposing a slide member in the differential case so as to be slidable in the axial direction and causing the slide member and the differential case to be meshed with each other. In this case, it is necessary to dispose a differential gear mechanism composed of a plurality of pinion gears and side gears inside the slide member, and to support a pinion gear shaft that supports the pinion gears so as to be movable relative to the slide member in the axial direction of the differential case. As a support structure for the pinion gear shaft, the inventors initially conceived of forming the slide member with a long hole that extends in the axial direction, and fitting an end portion of the pinion gear shaft with the long hole from an end portion of the slide member on one side in the axial direction. With such a structure, however, the slide member may be deformed by a drive force (torque) transferred from the slide member to the pinion gear shaft. In the case where the thickness of the slide member is increased in order to suppress such deformation, an increase in size or weight of the device is incurred.

SUMMARY OF THE INVENTION

It is an object of the present invention to provide a differential device configured to be capable of blocking transfer of a drive force between a differential case and a differential gear mechanism while suppressing an increase in size or weight of the device.

An aspect of the present invention provides a differential device including: a differential case, on an inner surface of which a meshed portion composed of a plurality of dog teeth is formed; a tubular slide member disposed so as to be movable in the differential case along an axial direction that is parallel to a rotational axis of the differential case, and having a meshing portion composed of a plurality of dog teeth to be meshed with the meshed portion; a differential gear mechanism disposed inside the slide member and composed of a plurality of pinion gears and side gears meshed with each other with gear axes of the pinion gears and the side gears orthogonal to each other; a pinion gear shaft that supports the plurality of pinion gears; and an actuator that moves the slide member with respect to the differential case in the axial direction between a first position, at which the meshing portion is meshed with the meshed portion, and a second position, at which the meshing portion is not meshed with the meshed portion. The slide member has a cylindrical portion which is formed in a cylindrical shape and on one side of which in the axial direction the meshing portion is formed, and a long hole that extends in the axial direction, that penetrates between inner and outer peripheral surfaces of the cylindrical portion, and that opens toward the other side in the axial direction, which is the opposite side from the meshing portion. The pinion gear shaft is supported by the slide member with an end portion of the pinion gear shaft fitted with the long hole. A reinforcing member that suppresses deformation of the slide member due to torque transferred from the slide member to the pinion gear shaft is attached to an end portion of the cylindrical portion of the slide member on the other side in the axial direction.

According to the present invention, it is possible to provide a differential device configured to be capable of blocking transfer of a drive force between a differential case and a differential gear mechanism while suppressing an increase in size or weight of the device.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

An embodiment of the present invention will be described with reference to FIGS. 1 to 8.

Figure 1:
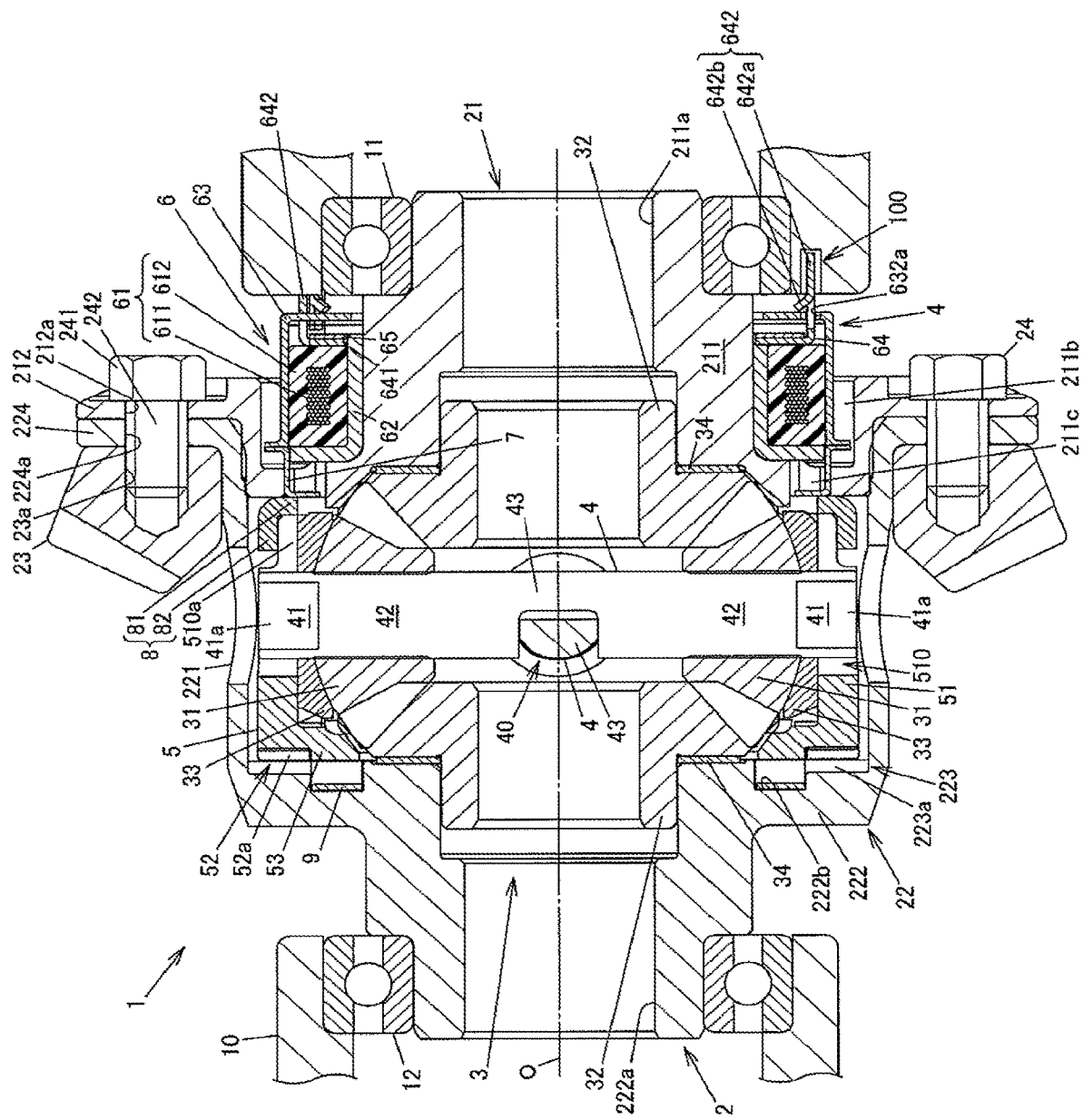
FIG. 1 is a sectional view illustrating an example of the configuration of a differential device according to an embodiment of the present invention.
Figure 2:
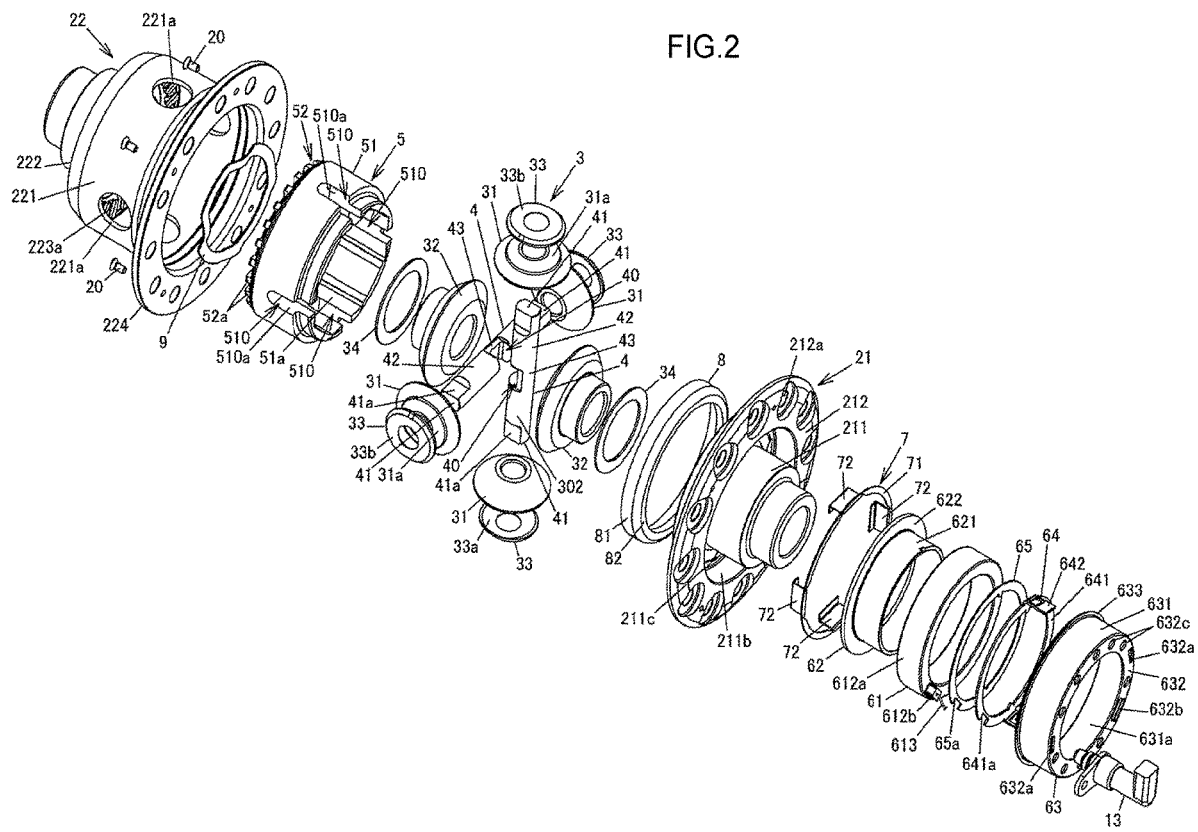
FIG. 2 is an exploded perspective view of the differential device.
Figure 3:
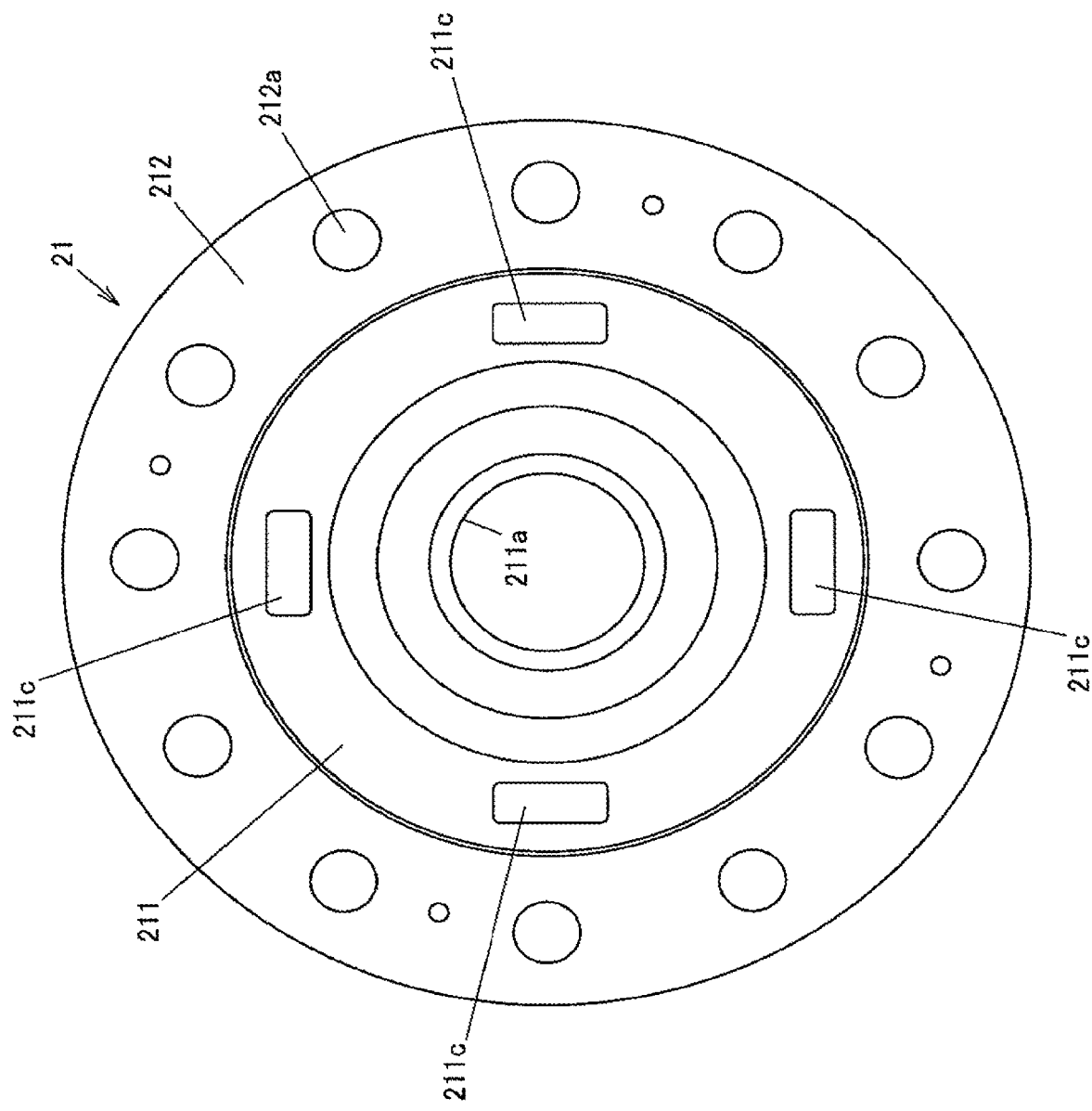
FIG. 3 is a plan view of an inner surface of a first case member of a differential case as seen in the axial direction.
Figure 4:
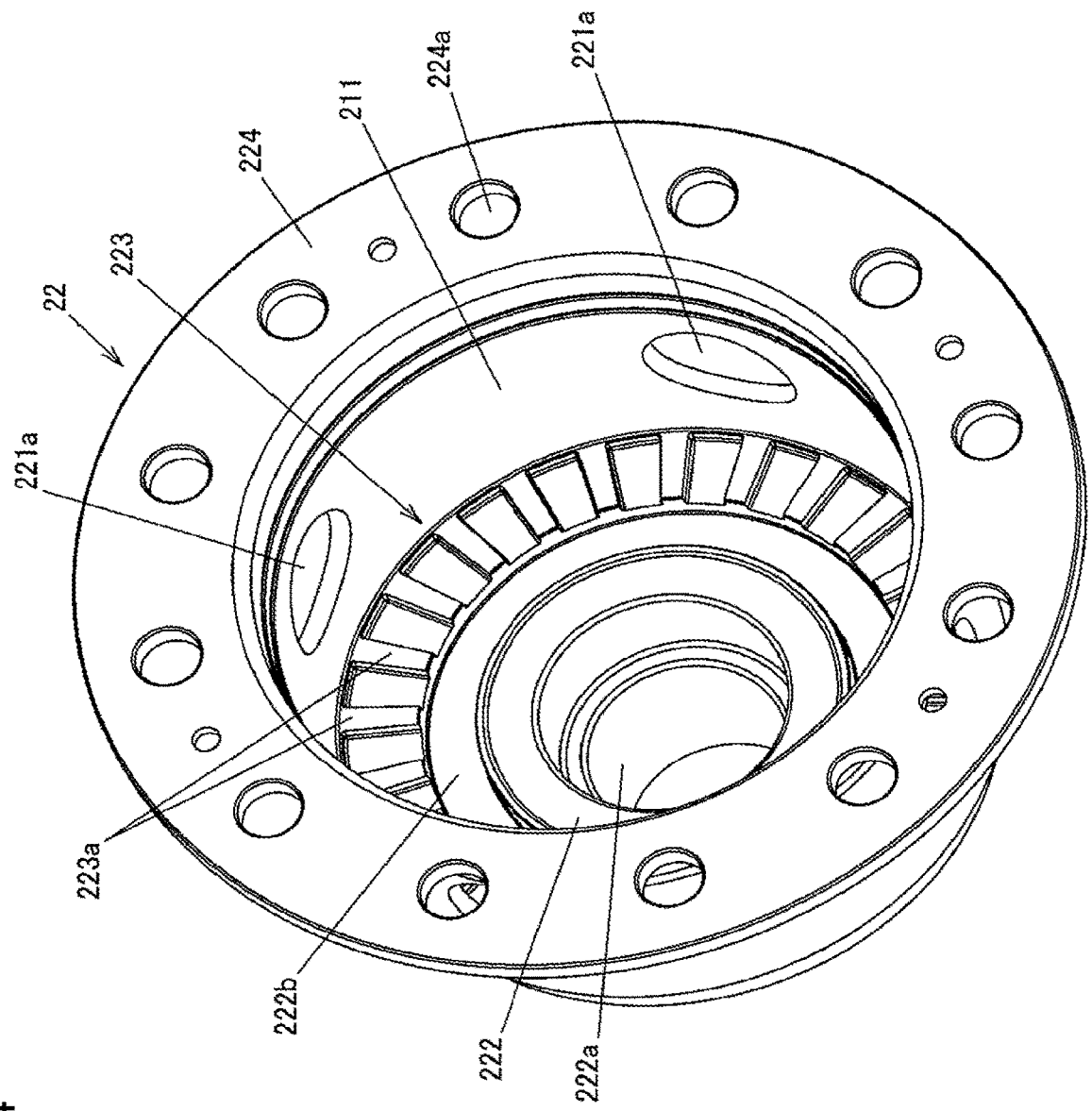
FIG. 4 is a perspective view illustrating a second case member of the differential case.
Figure 5A:
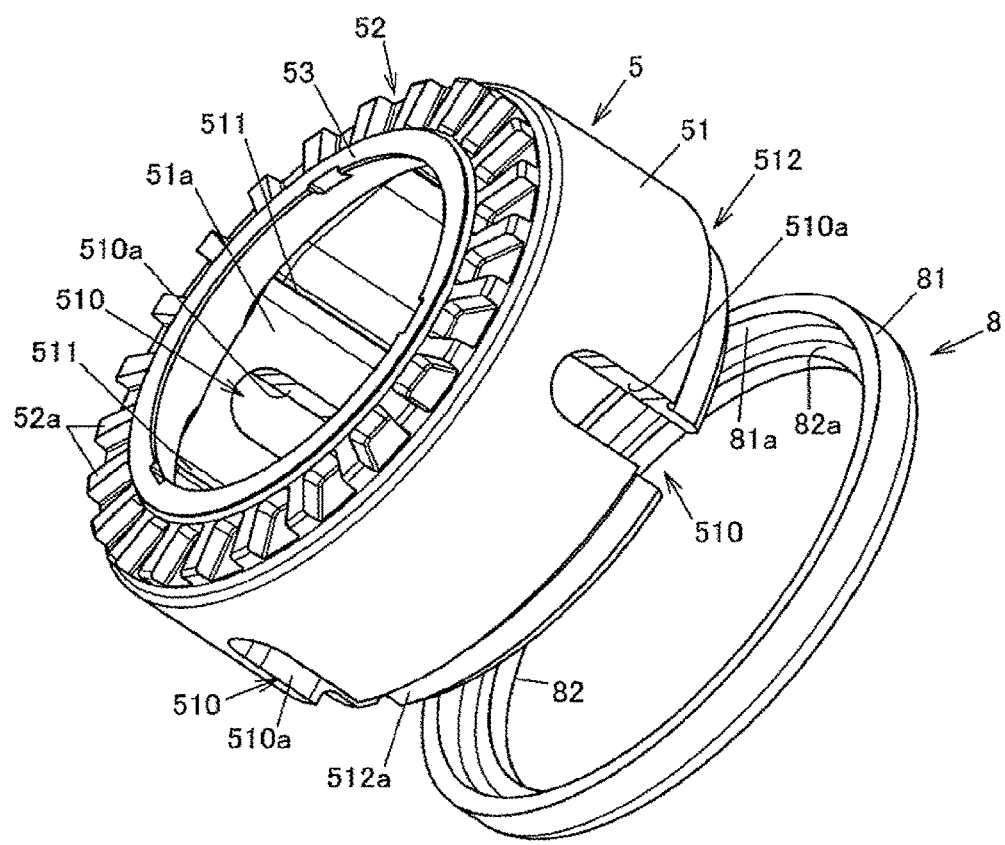
FIGS. 5A and 5B are each an exploded perspective view illustrating a slide member and a reinforcing ring.
Figure 5B:
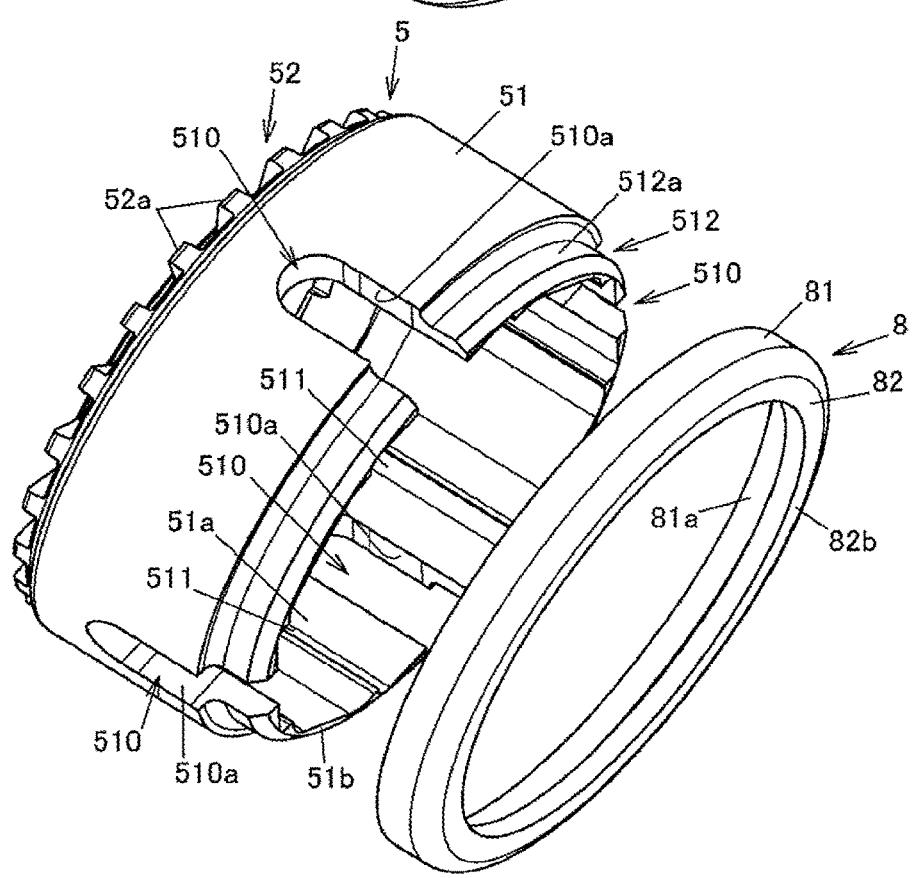
Figure 6A:
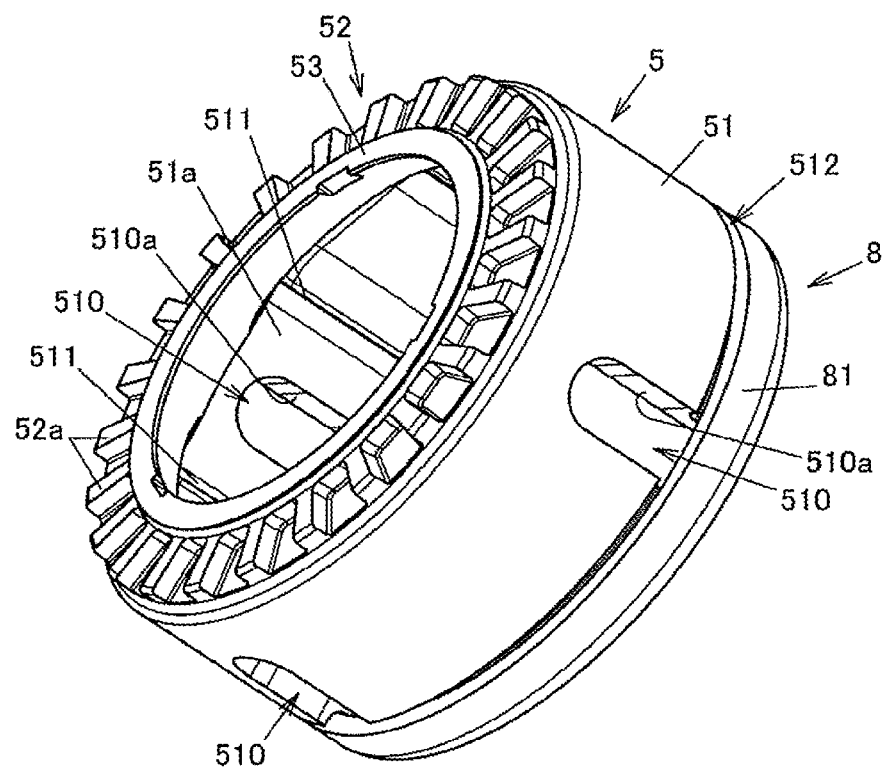
FIGS. 6A and 6B are each a perspective view illustrating a state in which the reinforcing ring is attached to the slide member.
Figure 6B:
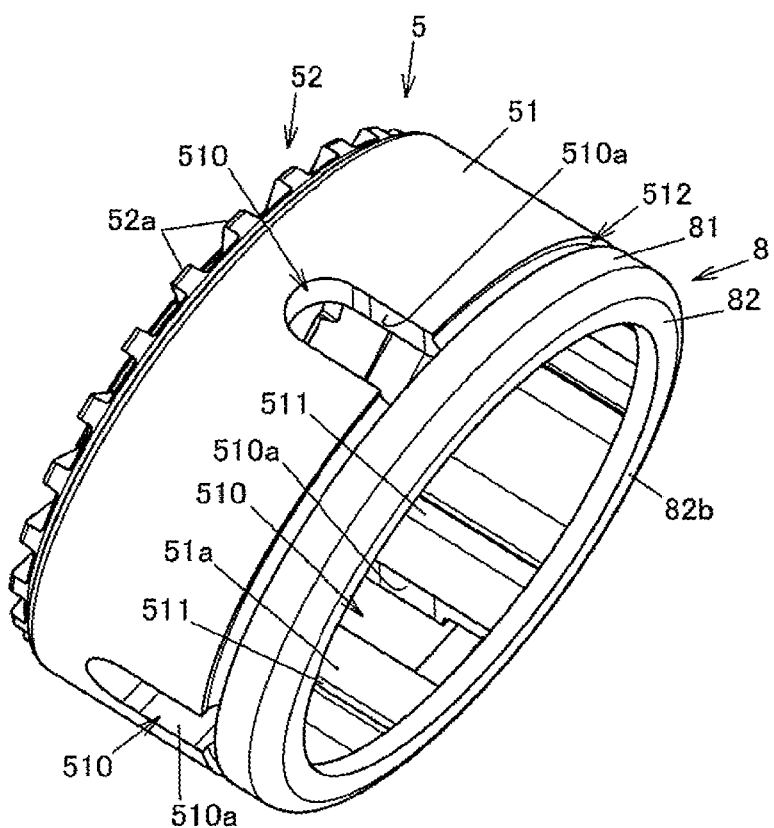

FIG. 1 is a sectional view illustrating an example of the configuration of a differential device according to an embodiment of the present invention. FIG. 2 is an exploded perspective view of the differential device. FIG. 3 is a plan view of an inner surface of a first case member of a differential case as seen in the axial direction. FIG. 4 is a perspective view illustrating a second case member of the differential case. FIGS. 5A and 5B are each an exploded perspective view illustrating a slide member and a reinforcing ring. FIGS. 6A and 6B are each a perspective view illustrating a state in which the reinforcing ring is attached to the slide member.

A differential device 1 is used to distribute a drive force of a drive source such as an engine of a vehicle to a pair of output shafts while allowing differential motion. More specifically, the differential device 1 according to the present embodiment is mounted on a four-wheel-drive vehicle that includes a pair of right and left main drive wheels (e.g. front wheels) to which the drive force of the drive source is always transferred and a pair of right and left auxiliary drive wheels (e.g. rear wheels) to which the drive force of the drive source is transferred in accordance with the travel state, and used as a differential device that distributes the drive force to the right and left auxiliary drive wheels. The vehicle is in a two-wheel-drive state in the case where the drive force is transferred to only the main drive wheels. The vehicle is in a four-wheel-drive state in the case where the drive force is transferred to both the main drive wheels and the auxiliary drive wheels.

In the four-wheel-drive state, the differential device 1 distributes the input drive force to right and left drive shafts on the side of the auxiliary drive wheels. In the two-wheel-drive state, meanwhile, the differential device 1 blocks transfer of the input drive force to the right and left drive shafts.

The differential device 1 has: a differential case 2 supported by a differential carrier 10 fixed to the vehicle body so as to be rotatable via a pair of bearings 11 and 12; a differential gear mechanism 3 composed of a plurality of pinion gears 31 and side gears 32; a pinion gear shaft 4 that supports the plurality of pinion gears 31; a tubular slide member 5 that supports the pinion gear shaft 4 in the differential case 2; an actuator 6 that moves the slide member 5 in the axial direction which is parallel to a rotational axis O of the differential case 2; a pressing member 7 that receives and transfers a moving force of the actuator 6 to the slide member 5; a reinforcing ring 8 that serves as a reinforcing member that reinforces the slide member 5; and a return spring 9 that urges the slide member 5 toward the side opposite to the direction of movement by the actuator 6.

Lubricating oil that lubricates the differential gear mechanism 3 is introduced into the differential case 2. The differential gear mechanism 3 is disposed inside the slide member 5. The actuator 6 is disposed outside the differential case 2. A part of the pressing member 7 is inserted through a through hole 211c formed in the differential case 2. With this configuration, the actuator 6 moves the slide member 5 with respect to the differential case 2 in the axial direction via the pressing member 7 from the outside of the differential case 2.

In the present embodiment, the slide member 5 supports two pinion gear shafts 4, and two pinion gears 31 are supported by each of the two pinion gear shafts 4. That is, in the present embodiment, the differential gear mechanism 3 is constituted by the four pinion gears 31 and a pair of side gears 32 meshed with the four pinion gears 31 with the gear axes of the pinion gears 31 and the side gears 32 orthogonal to each other. The pinion gears 31 and the side gears 32 are formed with a plurality of gear teeth. In FIG. 2, however, such gear teeth are not illustrated.

As illustrated in FIG. 2, each of the pinion gear shafts 4 has: a pair of supported portions 41 supported by the slide member 5; a pair of pinion gear support portions 42 to be inserted through the pinion gears 31; and a coupling portion 43 that couples the pair of pinion gear support portions 42 to each other. The supported portions 41, the pinion gear support portions 42, and the coupling portion 43 are integral with each other. Each of the pinion gear shafts 4 is formed in a shaft shape as a whole. The pair of supported portions 41 are provided at both end portions of the pinion gear shaft 4. The coupling portion 43 is provided at the center portion, in the axial direction, of the pinion gear shaft 4. The pair of pinion gear support portions 42 are provided between each of the pair of supported portions 41 and the coupling portion 43, and support the pinion gears 31.

The two pinion gear shafts 4 are meshed with each other at the center portions, in the axial direction, of the pinion gear shafts 4. Specifically, a recessed portion 40 formed at the center portion, in the longitudinal direction, of one of the pinion gear shafts 4 is fitted with the coupling portion 43 of the other pinion gear shaft 4, and a recessed portion 40 formed at the center portion, in the longitudinal direction, of the other pinion gear shaft 4 is fitted with the coupling portion 43 of the one pinion gear shaft 4. The two pinion gear shafts 4 are orthogonal to each other in the case where the pinion gear shafts 4 are seen along the rotational axis O of the differential case 2.

The slide member 5 has a tubular shape, the central axis of which coincides with the rotational axis O of the differential case 2, and is disposed so as to be movable in the axial direction with respect to the differential case 2. The slide member 5 has: a cylindrical portion 51 formed in a cylindrical shape; a meshing portion 52 composed of a plurality of dog teeth (meshing teeth) 52a; and an inner rib portion 53 provided on the radially inner side of the meshing portion 52. The cylindrical portion 51, the meshing portion 52, and the inner rib portion 53 are integral with each other. The meshing portion 52 is formed on one side, in the axial direction, of the cylindrical portion 51. The plurality of dog teeth 52a project in the axial direction. The cylindrical portion 51 is formed with long holes 510 that extend in the axial direction, that penetrate between the inner and outer peripheral surfaces of the cylindrical portion 51, and that open toward the other side in the axial direction, which is the opposite side from the meshing portion 52.

When the slide member 5 receives a moving force of the actuator 6 to be moved in the axial direction, the meshing portion 52 is meshed with a meshed portion 223 (to be discussed later) of the differential case 2 in the circumferential direction. An axial end surface of the inner rib portion 53 abuts against the return spring 9 to receive the urging force of the return spring 9. The actuator 6 moves the slide member 5 in the axial direction with respect to the differential case 2 between a first position, at which the meshing portion 52 is meshed with the meshed portion 223, and a second position, at which the meshing portion 52 is not meshed with the meshed portion 223. The meshing portion 52 of the slide member 5 and the meshed portion 223 of the differential case 2 constitute a dog clutch that can allow and block transfer of a drive force through meshing between the dog teeth.

The long holes 510 are fitted with the supported portions 41 of the pinion gear shafts 4. With the supported portions 41 of the pinion gear shafts 4 fitted with the long holes 510 of the slide member 5, the slide member 5 is movable in the axial direction relative to the pinion gear shafts 4. In the present embodiment, the supported portions 41 which are provided at both end portions of each of the two pinion gear shafts 4 are supported by the slide member 5, and therefore the cylindrical portion 51 is formed with four long holes 510.

The supported portions 41 have a width across flat shape in which both end portions in a direction that is orthogonal to a direction that is parallel to the rotational axis O are formed in a planar shape. Two flat surfaces 41a of the width across flat shape face an inner surface 510a of the long hole 510. The width of the long hole 510 in the circumferential direction of the slide member 5 is slightly larger than the distance between the two flat surfaces 41a, and smaller than the size (diameter) of the supported portions 41 in a direction that is parallel to the rotational axis O. With this configuration, rotation of the pinion gear shafts 4 relative to the slide member 5 is restricted.

The inner surface 510a of the long hole 510 has a U-shape in the case where the slide member 5 is seen from the outer peripheral side. The long holes 510 of the slide member 5 can be formed by cutting in which a cutting tool with a plurality of cutting blades formed on the outer peripheral surface of a shaft portion in a circular column shape, for example, is rotated about the axis of the shaft portion, and the cutting tool and the slide member 5 are moved relative to each other in the axial direction of the slide member 5. Two long holes 510 arranged in the direction of the diameter of the slide member 5 can be formed at the same time by using a cutting tool that is longer than the outside diameter of the slide member 5.

A washer 33 is disposed between an inner peripheral surface 51a of the cylindrical portion 51 of the slide member 5 and a back surface 31a of the pinion gear 31. The washer 33 has: an inner surface 33a that faces the back surface 31a of the pinion gear 31 and that has a partially spherical shape; and an outer surface 33b that faces the inner peripheral surface 51a of the cylindrical portion 51 of the slide member 5 and that has a planar shape. The washer 33 has an outer shape of a track that is longer in a direction that is parallel to the rotational axis O. The washer 33 is disposed between a pair of projecting streaks 511 (see FIGS. 5A and 5B) formed on the cylindrical portion 51 of the slide member 5. The pair of projecting streaks 511 extend in parallel with the rotational axis O. Rotation of the washer 33 is restricted with the washer 33 disposed between the pair of projecting streaks 511.

When the pinion gears 31 are rotated about the pinion gear shafts 4, the back surfaces 31a of the pinion gears 31 slide on the inner surfaces 33a of the washers 33. When the slide member 5 is moved in the axial direction with respect to the pinion gear shafts 4, the inner peripheral surface 51a of the cylindrical portion 51 of the slide member 5 slides on the outer surfaces 33b of the washers 33. Portions of the inner peripheral surface 51a of the cylindrical portion 51 that slide on the outer surfaces 33b of the washers 33 are each formed in a planar shape.

The pressing member 7 has: a ring portion 71 disposed outside the differential case 2; and a plurality of projecting pieces 72 provided to extend from the ring portion 71 in parallel with the rotational axis O of the differential case 2. In the present embodiment, the pressing member 7 is provided with four projecting pieces 72. The pressing member 7 is formed by pressing a steel plate. The distal end portions (end portions on the opposite side from the base end portions on the side of the ring portion 71) of the projecting pieces 72 are bent inward in the radial direction of the ring portion 71.

The actuator 6 has: an annular electromagnet 61 that has a coil winding 611 and a molded resin portion 612 molded with the coil winding 611 embedded; a yoke 62 that serves as a magnetic path for magnetic flux of the electromagnet 61 generated by energizing the coil winding 611; and an armature 63 that makes sliding contact with the molded resin portion 612 to be guided in the direction of the rotational axis O of the differential case 2. The section of the molded resin portion 612 taken along the rotational axis O has a rectangular shape. The meshing portion 52 of the slide member 5 is meshed with the meshed portion 223 by the moving force of the actuator 6 which is transferred via the pressing member 7.

An excitation current is supplied from a control device (not illustrated) to the coil winding 611 of the electromagnet 61 via a wire 613 leading out from a boss portion 612*b* (see FIG. 2) provided on the molded resin portion 612. The actuator 6 operates when an excitation current is supplied to the coil winding 611. The yoke 62 is made of soft magnetic metal such as low-carbon steel, and has: a cylindrical portion 621 that covers the inner peripheral surface of the molded resin portion 612 from the inner side; and a rib portion 622 that projects outward from one end portion, in the axial direction, of the cylindrical portion 621 to cover one axial end surface of the molded resin portion 612. The cylindrical portion 621 and the rib portion 622 are integral with each other. The yoke 62 is formed such that the bore diameter of the cylindrical portion 621 is slightly larger than the outside diameter of a portion of the differential case 2 that faces the inner peripheral surface of the cylindrical portion 621.

A rotation prevention member 64 and a stopper ring 65 are disposed at an end portion of the cylindrical portion 621 of the yoke 62 on the opposite side from the rib portion 622. The rotation prevention member 64 is engaged with the yoke 62 so as not to be relatively rotatable. The stopper ring 65 retains the electromagnet 61 and the rotation prevention member 64 on the yoke 62. The rotation prevention member 64 is made of non-magnetic metal such as austenitic stainless steel, and has: an annular portion 641 disposed at the outer periphery of the cylindrical portion 621 of the yoke 62; and a pair of protruding portions 642 provided at two locations in the circumferential direction to project in the axial direction from the annular portion 641. The annular portion 641 and the protruding portions 642 are integral with each other.

The rotation prevention member 64 prevents rotation of the yoke 62 with the pair of protruding portions 642 engaged with a recessed portion 100 formed in the differential carrier 10, and restricts axial movement of the yoke 62. The pair of protruding portions 642 of the rotation prevention member 64 are inserted through insertion through holes 632*a* formed in the armature 63 to extend in the axial direction to prevent rotation of the armature 63 with respect to the yoke 62 and the differential carrier 10. The protruding portions 642 each have: a plate portion 642*a* in a flat plate shape inserted through the insertion through hole 632*a* of the armature 63; and a retention protrusion 642*b* disposed on the side of the recessed portion 100 of the differential carrier 10 with respect to the insertion through hole 632*a* to restrict axial movement of the armature 63 with respect to the yoke 62. In the present embodiment, the retention protrusion 642*b* is formed by cutting and raising a part of the plate portion 642*a*.

The stopper ring 65 is interposed between the annular portion 641 of the rotation prevention member 64 and the electromagnet 61, and fixed to the cylindrical portion 621 of the yoke 62 by welding, for example. The stopper ring 65 and the annular portion 641 of the rotation prevention member 64 are formed with notches 65*a* and 641*a*, respectively, with which the boss portion 612*b* which is provided on the molded resin portion 612 of the electromagnet 61 is fitted.

The armature 63 is made of soft magnetic metal such as low-carbon steel, and has: an outer annular portion 631 disposed at the outer periphery of the electromagnet 61; a side plate portion 632 formed so as to project inward from one end portion, in the axial direction, of the outer annular portion 631; and a flange portion 633 formed so as to project outward from the other end portion, in the axial direction, of the outer annular portion 631. The outer annular portion 631, the side plate portion 632, and the flange portion 633 are integral with each other. The outer annular portion 631 has a cylindrical shape so as to cover the electromagnet 61 from the outer peripheral side. The side plate portion 632 faces the electromagnet 61 and the stopper ring 65 in the axial direction. The flange portion 633 abuts against the ring portion 71 of the pressing member 7.

The armature 63 is supported by the electromagnet 61 with an inner peripheral surface 631*a* of the outer annular portion 631 contacting an outer peripheral surface 612*a* of the molded resin portion 612. When the armature 63 is moved in the axial direction, the inner peripheral surface 631*a* of the outer annular portion 631 slides on the outer peripheral surface 612*a* of the molded resin portion 612.

The side plate portion 632 of the armature 63 is formed with: two insertion through holes 632*a*, through which the pair of protruding portions 642 of the rotation prevention member 64 are inserted; a through hole 632*b* penetrated by the boss portion 612*b* of the electromagnet 61; and a plurality of (ten in the example illustrated in FIG. 2) oil holes 632*c* that allow a flow of lubricating oil.

The differential case 2 has a first case member 21 in a disc shape and a second case member 22 in a bottomed cylindrical shape. The first case member 21 blocks the opening of the second case member 22. A washer 34 in an annular plate shape is disposed in the differential gear mechanism 3 between the pair of side gears 32 and the first case member 21 and the second case member 22.

As illustrated in FIG. 4, the second case member 22 has: a cylindrical portion 221 that houses the differential gear mechanism 3 and the slide member 5 therein; a bottom portion 222 that extends inward from one end portion, in the axial direction, of the cylindrical portion 221; the meshed portion 223 with which the meshing portion 52 of the slide member 5 is meshed; and a flange portion 224 that extends outward from the other end portion, in the axial direction, of the cylindrical portion 221. The cylindrical portion 221, the bottom portion 222, the meshed portion 223, and the flange portion 224 are integral with each other. The cylindrical portion 221 is formed with a plurality of oil holes 221*a* that allow a flow of lubricating oil. The bottom portion 222 is formed with: a shaft insertion hole 222*a*, into which a drive shaft coupled to one of the pair of side gears 32 so as not to be relatively rotatable is inserted; and an annular groove 222*b* that houses the return spring 9. In the present embodiment, the return spring 9 is constituted of a wave washer, and housed in the annular groove 222*b* as compressed in the axial direction.

The meshed portion 223 is composed of a plurality of dog teeth 223*a* provided at equal intervals along the circumferential direction, and provided on the side of the bottom portion 222 of the second case member 22. In the present embodiment, the plurality of dog teeth 223*a* are formed so as to project in the axial direction from the inner surface of the bottom portion 222 of the second case member 22. The return spring 9 urges the slide member 5 in the direction of moving the slide member 5 away from the bottom portion 222 of the second case member 22.

The first case member 21 has: a disc portion 211 that faces the bottom portion 222 of the second case member 22 in the axial direction; and a flange portion 212 brought into abutment with the flange portion 224 on the side of the second case member 22. The disc portion 211 and the flange portion 212 are integral with each other. The flange portion 212 of the first case member 21 and the flange portion 224 of the second case member 22 are coupled to each other by a plurality of screws 20 (see FIG. 2). The disc portion 211 is formed with a shaft insertion hole 211a, into which a drive shaft coupled to the other of the pair of side gears 32 so as not to be relatively rotatable is inserted. The disc portion 211 is formed with: an annular groove 211b formed so as to be dented in the axial direction from the outer surface on the opposite side from a surface that faces the bottom portion 222 of the second case member 22; and a plurality of through holes 211c that communicate with the annular groove 211b and that penetrate the disc portion 211 in the axial direction.

The annular groove 211b of the first case member 21 houses respective portions of the electromagnet 61, the yoke 62, and the armature 63 of the actuator 6. The plurality of projecting pieces 72, which are a part of the pressing member 7, are inserted through the through holes 211c of the first case member 21. The ring portion 71 of the pressing member 7 is disposed in the annular groove 211b. The pressing member 7 is rotated together with the first case member 21.

A drive force is input to the differential case 2 from an annular ring gear 23 (see FIG. 1) fixed to the flange portions 212 and 224 of the first and second case members 21 and 22, respectively. The ring gear 23 is fixed to the outer periphery of the cylindrical portion 221 of the second case member 22 on the side of the flange portion 224. In the present embodiment, the ring gear 23 is fixed so as to rotate together with the differential case 2 by a plurality of fastening bolts 24 inserted through a plurality of bolt insertion through holes 212a formed in the flange portion 212 of the first case member 21 and a plurality of bolt insertion through holes 224a formed in the flange portion 224 of the second case member 22. The fastening bolts 24 each have: a head portion 241 that abuts against the flange portion 212 of the first case member 21; and a shaft portion 242 on which an external thread is formed and which is inserted through the bolt insertion through holes 212a and 224a to be threadably engaged with a screw hole 23a of the ring gear 23.

Next, operation of the differential device 1 will be described with reference to FIGS. 7A and 7B.

Figure 7A:
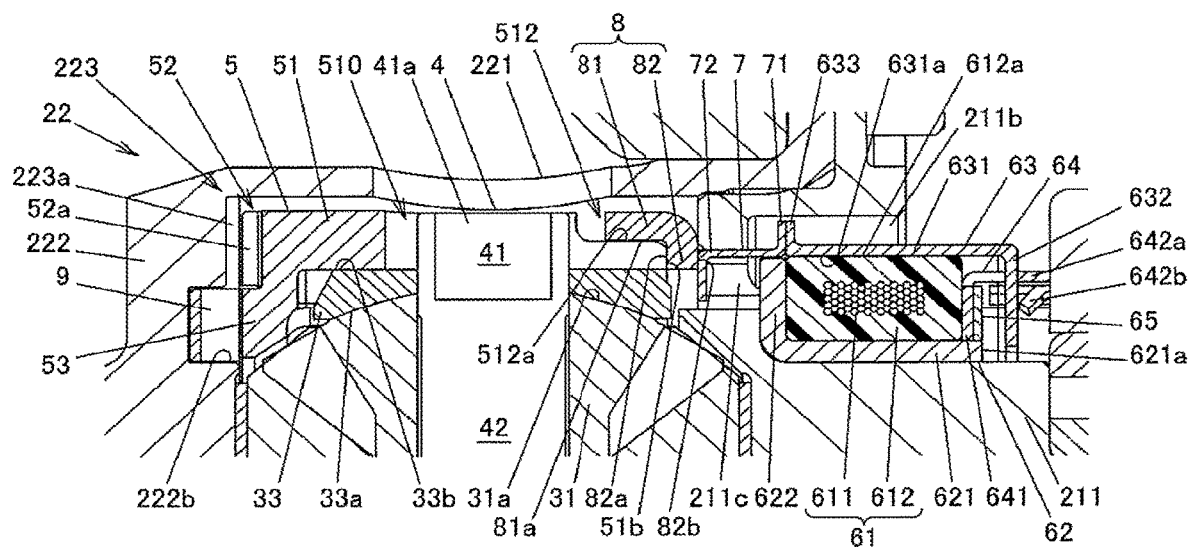
FIGS. 7A and 7B are each a partial sectional view illustrating the differential device at the time when an actuator is not operating and when the actuator is operating, respectively.

FIG. 7A is a partial sectional view illustrating the differential device 1 at the time when the actuator 6 is not operating. FIG. 7B is a partial sectional view illustrating the differential device 1 at the time when the actuator 6 is operating. The differential device 1 is switched between a coupled state, in which the slide member 5 and the differential case 2 are coupled so as not to be rotatable relative to each other with the dog teeth 52a and 223a of the meshing portion 52 and the meshed portion 223, respectively, meshed with each other in the circumferential direction, and a non-coupled state in which the slide member 5 and the differential case 2 are rotatable relative to each other, in accordance with whether the actuator 6 is or is not operating.

When the actuator 6 is not operating with no excitation current supplied to the coil winding 611 of the electromagnet 61, the slide member 5 is moved toward the disc portion 211 of the first case member 21 by the restoring force of the return spring 9, which releases meshing between the meshing portion 52 of the slide member 5 and the meshed portion 223 of the differential case 2. When the electromagnet 61 is de-energized, the armature 63 is returned to the second position, at which the armature 63 is away from the bottom portion 222, by the restoring force of the return spring 9 which is transmitted via the slide member 5, the reinforcing ring 8, and the pressing member 7.

When the actuator 6 is not operating, the differential case 2 and the slide member 5 are rotatable relative to each other, and thus transfer of a drive force from the differential case 2 to the differential gear mechanism 3 is blocked. Consequently, the vehicle is brought into the two-wheel-drive state with the drive force which is input from the ring gear 23 to the differential case 2 not transferred to the drive shafts.

Figure 7B:
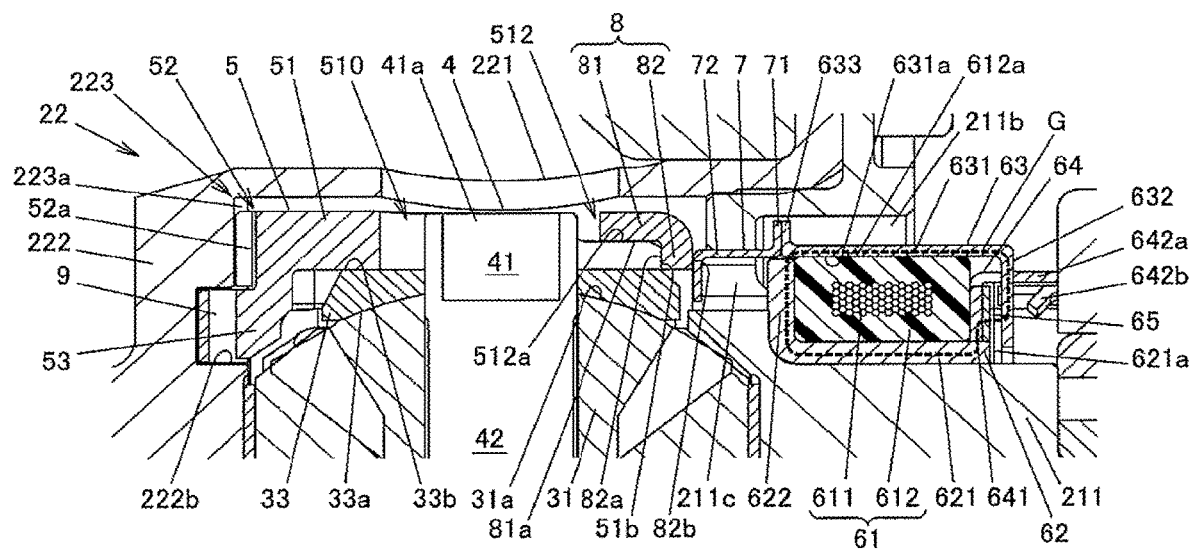

When an excitation current is supplied to the coil winding 611 of the electromagnet 61, on the other hand, magnetic flux is generated in a magnetic path G indicated by the dashed line in FIG. 7B. Then, the armature 63 is moved in the axial direction by the magnetic force of the electromagnet 61 such that the side plate portion 632 of the armature 63 approaches an axial end surface 621a of the cylindrical portion 621 of the yoke 62. Consequently, the pressing member 7 presses the slide member 5 toward the bottom portion 222 of the second case member 22, which moves the slide member 5 to the first position at which the meshing portion 52 and the meshed portion 223 are meshed with each other. Specifically, the pressing member 7 receives a moving force of the armature 63 from the ring portion 71, and the moving force presses the slide member 5 toward the bottom portion 222 of the second case member 22 via the reinforcing ring 8. The position of the armature 63 is detected by a position sensor 13 (see FIG. 2) fixed to the differential carrier 10.

When the meshing portion 52 and the meshed portion 223 are meshed with each other, the vehicle is brought into the four-wheel-drive state with the drive force which is input from the ring gear 23 to the second case member 22 of the differential case 2 transferred to the drive shafts via the slide member 5, the pair of pinion gear shafts 4 of the differential gear mechanism 3, the four pinion gears 31, and the pair of side gears 32.

When the actuator 6 is brought from the non-operating state into the operating state, the control device supplies the electromagnet 61 with an excitation current with a large current value that enables rapid movement of the slide member 5. After that, when it is determined that the meshing portion 52 and the meshed portion 223 are meshed with each other, the current value of the excitation current is reduced to a relatively small current value that can still maintain the state in which the meshing portion 52 and the meshed portion 223 are meshed with each other. Consequently, power consumption can be reduced.

Figure 8:
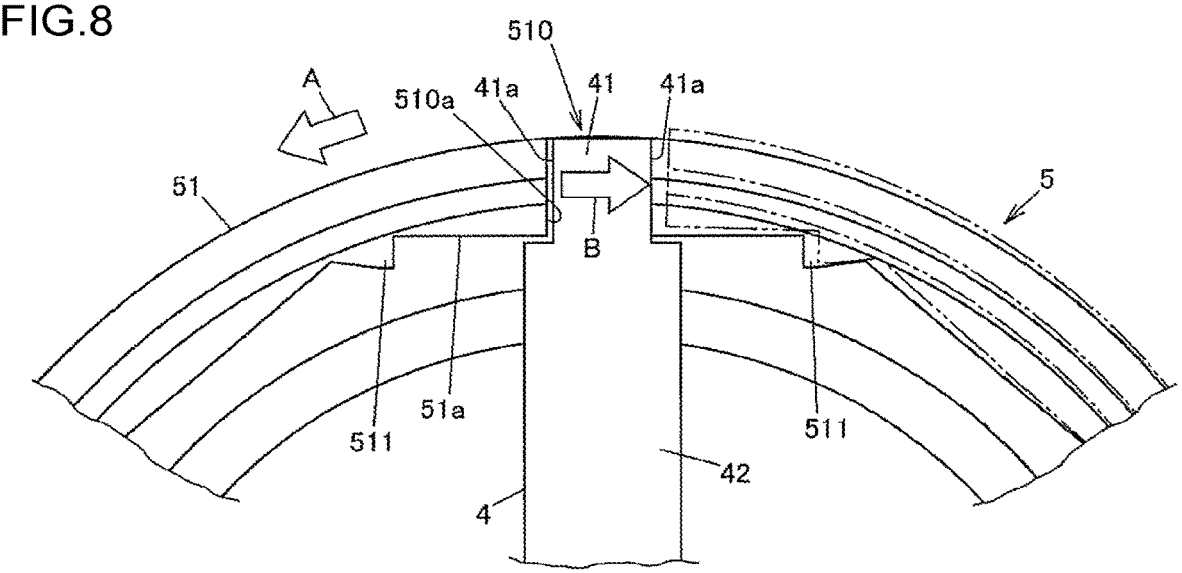
FIG. 8 illustrates respective portions of the slide member and a pinion gear shaft as seen in the axial direction.

In the four-wheel-drive state in which the meshing portion 52 and the meshed portion 223 are meshed with each other, a force that deforms the slide member 5 is generated by torque transferred from the slide member 5 to the pinion gear shaft 4 as illustrated in FIG. 8.

FIG. 8 illustrates respective portions of the slide member 5 and the pinion gear shaft 4 during four-wheel drive as seen from the side of the first case member 21. In FIG. 8, the arrow A indicates a force (torque) that the slide member 5 receives from the differential case 2, and the arrow B indicates a force (torque reaction force) applied from the pinion gear shaft 4 to the slide member 5.

When the drive force of the drive source is transferred from the differential case 2 to the pinion gear shaft 4 via the slide member 5 with the meshing portion 52 and the meshed portion 223 meshed with each other, the slide member 5 receives a torque reaction force from the pinion gear shaft 4. The torque reaction force acts so as to increase the width of the long holes 510 by deforming the slide member 5 so as to expand a part of the cylindrical portion 51 radially outward. In FIG. 8, the shape of the slide member 5 after being deformed by the torque reaction force from the pinion gear shaft 4 is indicated by the long dashed double-short dashed line. In FIG. 8, in order to clarify illustration, differences in shape before and after the deformation are indicated in an exaggerated manner.

Since durability may be reduced when the slide member 5 is significantly deformed by the torque reaction force from the pinion gear shaft 4, it is desirable that the amount of deformation of the slide member 5 should be small. In order to suppress deformation of the slide member 5 during torque transfer, it is conceivable to enhance strength by increasing the thickness of the slide member 5, for example. In this case, however, an increase in size and weight of the differential device 1 is incurred. Thus, in the present embodiment, deformation of the slide member 5 such as that described above is suppressed by attaching the reinforcing ring 8, which serves as a reinforcing member, to an end portion of the cylindrical portion 51 of the slide member 5 on the side of the openings of the long holes 510 (an end portion on the opposite side from the meshing portion 52).

The reinforcing ring 8 has: an annular portion 81 that covers an end portion of the cylindrical portion 51 of the slide member 5 over the entire periphery; and a disc portion 82 that projects radially inward from one end portion of the annular portion 81. The annular portion 81 and the disc portion 82 are integral with each other. The reinforcing ring 8 is made of a steel material that is the same as that of the slide member 5, for example, and formed to have an L-shape in section. The annular portion 81 of the reinforcing ring 8 is externally fitted with the cylindrical portion 51 by press-fitting.

A side surface 82a of the disc portion 82 on one side in the axial direction faces an axial end surface 51b of the cylindrical portion 51. In the present embodiment, the annular portion 81 is press-fitted in the axial direction with the outer peripheral surface of the cylindrical portion 51 of the slide member 5 until the side surface 82a of the disc portion 82 on one side in the axial direction abuts against the axial end surface 51b of the cylindrical portion 51. However, the present invention is not limited thereto, and a clearance may be formed between the side surface 82a of the disc portion 82 on one side in the axial direction and the axial end surface 51b of the cylindrical portion 51.

The slide member 5 is formed with a notch 512 provided at an end portion of the cylindrical portion 51 on the side of the openings of the long holes 510 to extend in the circumferential direction. The outside diameter of a portion of the cylindrical portion 51 at which the notch 512 is formed is smaller than the outside diameter of other portions of the cylindrical portion 51 (portions at which the notch 512 is not formed). The annular portion 81 of the reinforcing ring 8 is externally fitted with a portion at which the notch 512 is formed. An inner peripheral surface 81a of the annular portion 81 tightly contacts an outer peripheral surface 512a of a portion of the cylindrical portion 51 at which the notch 512 is formed. The margin of press-fitting of the annular portion 81, which is the difference in radius between the bore diameter of the inner peripheral surface 81a of the annular portion 81 and the outside diameter of the outer peripheral surface 512a of the cylindrical portion 51 before attachment of the reinforcing ring 8 to the slide member 5, is 10 to 50 μm, for example.

As illustrated in FIGS. 7A and 7B, the plurality of projecting pieces 72 of the pressing member 7 abut against a side surface 82b of the disc portion 82 of the reinforcing ring 8 on the other side in the axial direction (on the opposite side from the axial end surface 51b of the cylindrical portion 51). The pressing member 7 receives a moving force of the actuator 6 from the ring portion 71, and presses the reinforcing ring 8 using the projecting pieces 72 to move the slide member 5 toward the bottom portion 222 of the second case member 22. The side surface 82b of the disc portion 82 of the reinforcing ring 8 is a flat surface with no step or recesses or projections. Relative rotation between the slide member 5, which is rotated together with the reinforcing ring 8, and the differential case 2, in which the projecting pieces 72 of the pressing member 7 are inserted through the through holes 221c, is made smooth with the projecting pieces 72 of the pressing member 7 abutting against the side surface 82b.

With the embodiment described above, in which the reinforcing ring 8 is attached to an end portion of the cylindrical portion 51 of the slide member 5, deformation of the slide member 5 in which the width of the long holes 510 is increased by the torque reaction force from the pinion gear shafts 4 is suppressed. Consequently, it is possible to block transfer of a drive force between the differential case 2 and the differential gear mechanism 3 through axial movement of the slide member 5 while suppressing an increase in size or weight of the differential device 1.

The first case member 21 of the differential case 2 is formed with the through holes 211c through which the projecting pieces 72 of the pressing member 7 are inserted. In the present embodiment, however, the first case member 21 is not directly involved in the transfer of a drive force, and thus a reduction in strength of the first case member 21 due to the formation of the through holes 211c does not affect the torque transfer capacity etc. of the differential device 1. The through holes 211c can be made smaller than the axial holes through which the axially projecting portions of the first clutch portion are inserted in the case where a differential device is configured as in JP 2015-87015 A mentioned above, for example, and therefore have a slight effect on the strength of the first case member 21.

In the present embodiment, the annular portion 81 of the reinforcing ring 8 is externally fitted with an end portion of the cylindrical portion 51 of the slide member 5 by press-fitting. Thus, it is possible to appropriately suppress deformation of the slide member 5 such as that indicated by the long dashed double-short dashed line in FIG. 8. In the present embodiment, the reinforcing ring 8 functions also as a sliding contact member that makes sliding contact with the projecting pieces 72 of the pressing member 7, which makes relative rotation between the pressing member 7, which is rotated together with the differential case 2, and the slide member 5 smooth.

In the present embodiment, the annular portion 81 of the reinforcing ring 8 is externally fitted with the notch 512 which is formed in the outer peripheral surface of the cylindrical portion 51 of the slide member 5. Thus, the reinforcing ring 8 is configured not to project significantly toward the radially outer side with respect to a portion of the outer peripheral surface of the cylindrical portion 51 at which the notch 512 is not formed. Consequently, an increase in size of the differential device 1 is suppressed.

The present invention can be modified, as appropriate, without departing from the scope and spirit of the present invention. For example, in the embodiment described above, the annular portion 81 of the reinforcing ring 8 is externally fitted by press-fitting. However, the present invention is not limited thereto, and the annular portion 81 may be welded to the cylindrical portion 51 of the slide member 5, for example. In the embodiment described above, the differential gear mechanism 3 has four pinion gears 31, and the four pinion gears 31 are supported by two pinion gear shafts 4. However, the present invention is not limited thereto, and the differential gear mechanism 3 may have two pinion gears 31, and the two pinion gears 31 are supported by one pinion gear shaft 4.

Figure 9:
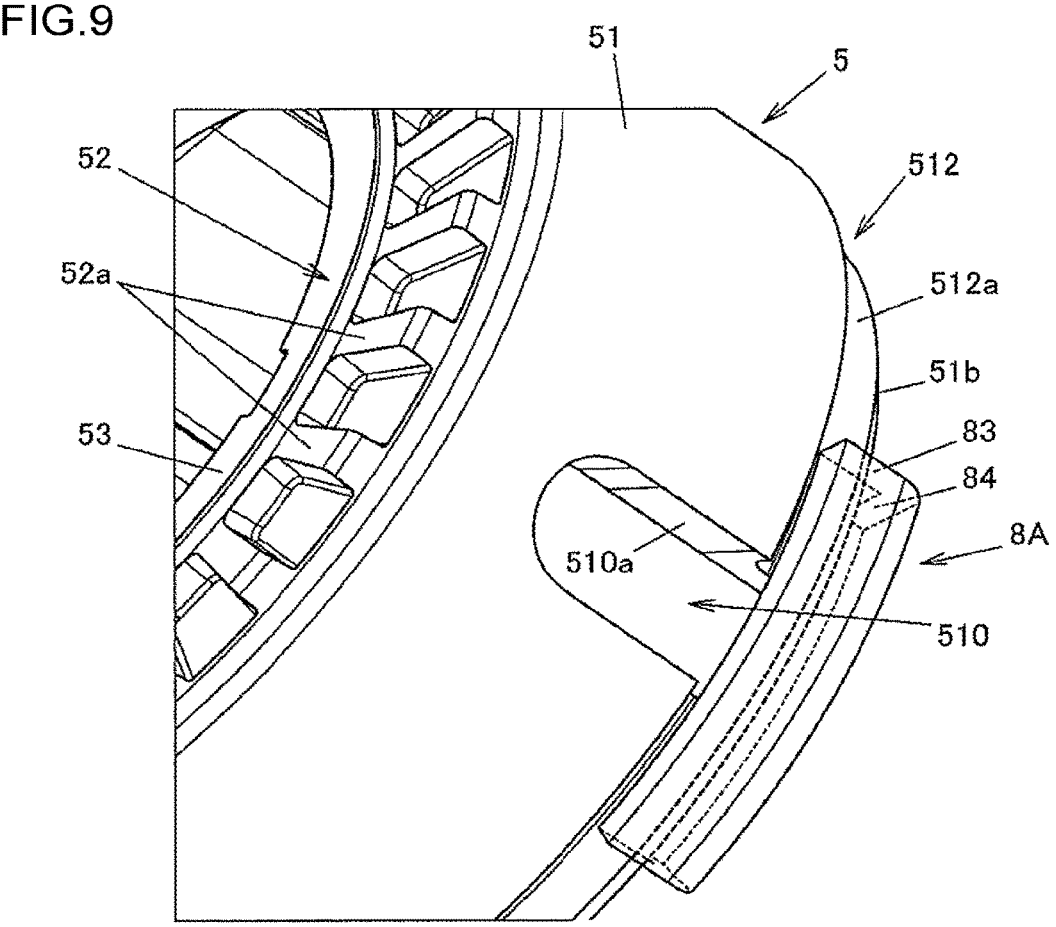
FIG. 9 is a perspective view illustrating a state in which a reinforcing member according to a modification is attached to the slide member.

In the embodiment described above, the reinforcing ring 8 which serves as the reinforcing member has an annular shape as a whole. However, the present invention is not limited thereto. A plurality of arcuate reinforcing members 8A may be used as illustrated in FIG. 9, for example, as long as deformation of the slide member 5 in which the width of the long holes 510 is increased can be suppressed. The plurality of reinforcing members 8A may be fixed by welding or the like so as to bridge both sides of the long holes 510 in the circumferential direction of the cylindrical portion 51. The reinforcing members 8A each have: an arcuate portion 83 joined to the outer peripheral surface 512a of a portion of the cylindrical portion 51 of the slide member 5 at which the notch 512 is formed; and an arcuate wall portion 84 that projects from the arcuate portion 83 toward the radially inner side of the slide member 5 to face the axial end surface 51b of the cylindrical portion 51. The arcuate portion 83 and the arcuate wall portion 84 are integral with each other. In FIG. 9, the shape of a portion of the slide member 5 covered by the reinforcing member 8A is indicated by the dashed lines. In the case where the reinforcing members 8A are used, in order to allow the reinforcing members 8A to smoothly slide with respect to the pressing member 7, the ring portion 71 of the pressing member 7 may be caused to abut against the arcuate wall portions 84 of the plurality of reinforcing members 8A, and the plurality of projecting pieces 72 which extend from the ring portion 71 in parallel with the rotational axis O of the differential case 2 to be inserted through the through holes 211c of the differential case 2 may be caused to abut against the armature 63. Also with the reinforcing members 8A, it is possible to suppress deformation of the slide member 5 due to torque transferred from the slide member 5 to the pinion gear shafts 4.

What is claimed is:

1. A differential device comprising:
    a differential case, on an inner surface of which a meshed portion composed of a plurality of dog teeth is formed;
    a tubular slide member disposed so as to be movable in the differential case along an axial direction that is parallel to a rotational axis of the differential case, and having a meshing portion composed of a plurality of dog teeth to be meshed with the meshed portion;
    a differential gear mechanism disposed inside the slide member and composed of a plurality of pinion gears and side gears meshed with each other with gear axes of the pinion gears and the side gears orthogonal to each other;
    a pinion gear shaft that supports the plurality of pinion gears; and
    an actuator that moves the slide member with respect to the differential case in the axial direction between a first position, at which the meshing portion is meshed with the meshed portion, and a second position, at which the meshing portion is not meshed with the meshed portion, wherein:
    the slide member has a cylindrical portion which is formed in a cylindrical shape and on one side of which in the axial direction the meshing portion is formed, and a long hole that extends in the axial direction, that penetrates between inner and outer peripheral surfaces of the cylindrical portion, and that opens toward the other side in the axial direction, which is the opposite side from the meshing portion;
    the pinion gear shaft is supported by the slide member with an end portion of the pinion gear shaft fitted with the long hole; and
    a reinforcing member that suppresses deformation of the slide member due to torque transferred from the slide member to the pinion gear shaft is attached to an end portion of the cylindrical portion of the slide member on the other side in the axial direction.

2. The differential device according to claim 1, wherein the reinforcing member has an annular portion that covers an end portion, on the other side in the axial direction, of the cylindrical portion of the slide member over the entire circumference, and the annular portion is externally fitted with the cylindrical portion by press-fitting.

3. The differential device according to claim 2, wherein:
    the actuator presses the reinforcing member in the axial direction via a pressing member, a part of which is inserted into a through hole that penetrates the differential case in the axial direction;
    the reinforcing member has a disc portion that projects radially inward from the annular portion to face an axial end surface of the slide member; and
    the pressing member abuts against the disc portion of the reinforcing member.

* * * * *